Patented Oct. 28, 1941

2,260,882

UNITED STATES PATENT OFFICE 2,260,882

WALL PROTECTIVE COATING

Elmer G. Berg, Chicago, Ill., assignor of forty per cent to Robert Hoffman, Chicago, Ill.

No Drawing. Application February 15, 1939, Serial No. 256,493

7 Claims. (Cl. 134—46)

This invention relates to a transparent coating for protecting interior walls having painted or waterproof paper surfaces and more particularly to a coating soluble in water by which it may be readily removed when dirty without the use of alkaline detergent, thereby exposing the painted surface beneath in its original fresh condition and ready to receive a second protective transparent coating.

Protecting painted surfaces by the use of a transparent coating is almost as old as the subject of painting. Artists and wood finishers have used varnishes and the housewife has used wax. In each instance, the coating is intended to bear the brunt of wear, to receive the dust and dirt and to resist the effects of oxidation, water and grease. In short, the costly surface is held unharmed and when the protective coating becomes dirty, it is removed by the use of some solvent and a fresh coating applied.

It is quite obvious that if a painted interior surface can be coated with a transparent coating and at the end of a year this transparent coating can be easily removed, the transparent coating will have taken up all of the dirt and grease, and upon removal, the painted surface will appear as new. The surface may then be recoated. So long as this process may be repeated, a distinct saving in materials and labor will be effected, providing the protective coating is cheap and easily applied and removed.

For many years a soured starch and water solution has been used to protect newly painted interior surfaces. Upon drying, the coating is sufficiently transparent that the coloring of the paint shows through with approximately the same tone and strength as if the starch coating had not been applied. Commercial establishments such as hotels, apartments and the like, which cannot use the inexpensive calcimine coatings, very generally experimented with the starch protective coating. In the spring, such property owners apply to the walls a coat of paint and protect this with starch. The following spring, the starch coating is removed by soap, water and scrubbing, and the painted surface, now a year old, is exposed in good condition, although suffering somewhat from the effects of soap and scrubbing incident to the removal of the starch. A new starch coating is then added. This process, when repeated for four or five years, constitutes a decided saving over the cost of yearly or bi-yearly painting.

The starch coating has these definite advantages: its cost is low, being a fraction of the cost of paint; it is easily applied; and it is sufficiently hard and impenetrable that few, if any, stains, greases, dirt and what not can reach the paint itself. On the other hand, it has disadvantages which challenge its advantages. Firstly, the quality of starch varies and this, coupled with the fact that the ordinary painter does not know how long to let the starch in water solution sour, results in a product of varying consistency and quality. All too frequently the management finds checked or coagulated coatings on the walls of a suite already occupied by a tenant.

A second difficulty with starch is its strong odor on souring. Painters do not like to work with it and after the coating has dried it continues to give off an offensive odor for several days, making the room unusable. A third objection to a starch coating is its tendency to increase rather than decrease gloss. It is well known that on interior surfaces, flat tones are preferred and the starch finish counteracts the flat tone paint which it covers by itself supplying a gloss. This has been overcome to some extent by adding a small amount of buttermilk to the starch solution.

The fourth and most important objection to the starch finish is the difficulty of removal. The hardening process of starch does not cease within a few hours after application. It continues to harden. Soap, water and scrubbing are necessary to remove it and after the starch has been on the wall for a year or more, the scrubbing necessary to remove it may seriously damage the paint undercoat. It is possible that a commercial manufacturer could overcome the first three objections to starch by the use of a sterilizing agent, a perfume and a substance similar to buttermilk, but making the starch coating soluble in water or in any other solution of commercial cheapness is a problem, the solution of which is not known. The last objection to starch is the necessity of stippling immediately after application. The starch is applied with a broad brush and brush marks are conspicuous. These can be eliminated by stippling. The stippling requires as much time as the application.

Building managements and contractors know that the cost of removing a starch coating and of re-starching the wall is almost as great as applying a fresh coat of paint. By painting the wall every two years, approximately the same appearance may be maintained as painting it every five or six years and keeping it coated with starch during the entire period.

The general object of this invention is to provide a transparent or a semi-transparent wall coating, which will not require stippling, at least when applied to previously stippled surfaces, which upon drying will be impenetrable to dirts, greases and the like, but which may be removed by washing with water without the use of soap or scrubbing.

Enumerating my specific objects, I wish to provide firstly a coating of constant quality and consistency. Secondly, I wish to provide a coating which is odorless. Thirdly, I wish to provide a coating which leaves the color tone of the surfaces unimpaired. Fourthly, I wish to provide a coating which adheres tightly to the wall. Fifthly, I wish to provide a coating which will not show brush marks. Finally and most important, I wish to provide a coating which may be washed from a surface by water alone without scrubbing or the use of soap or detergents.

An incidental use for my coating is to protect the hands, as those of painters and mechanics. By merely dipping the hands in the coating and permitting it to dry, paint, grease and dirt will collect on the coating and upon washing, being water soluble, the whole will be removed.

Attention is called to the fact that my coating is useful only on surfaces which in themselves will not be affected by water, for as will appear more fully hereinafter, the solvent of my coating is water and as it is applied in a liquid state, the water must have no effect upon the covered surface. More specifically, this coating will not be used on a calcimined or powdery surface for the reason that during aplication, that surface would be streaked and the powdery particles would interfere with the action of my coating. Moreover, at the time of removing my coating, the calcimine would also be removed. My coating will not be used on exterior surfaces because of its water solubility.

In its simplest form, my coating comprises a Wyoming bentonite and an adhesive suspended in water. Inasmuch as bentonite is or may be one element in three or four hundred United States patents, it seems to me desirable to distinguish existing uses and compositions in order that the scope of this invention may be recognized.

The bentonite with which I am concerned is one which has the characteristics of adsorbing several times its own weight of water and of swelling many times its apparent dry volume. Most bentonite having these qualities comes from the Black Hills district of South Dakota and eastern Wyoming.

The uses of bentonite have been principally those uses which its unique characteristics may obviously be utilized to fulfill. Its first group of uses may be classified as those where the bentonite suspends other material in water or some other solvent. Bentonite will hold finely divided abrasive material in a paste suspension which thereby becomes a polishing compound. It assists in emulsification as where it is desired to hold poisons evenly distributed in an aqueous suspension as in an insecticide or a fungicide. It is the gelatinizing medium for many dentrifices, face creams and beauty clays. It is the element which prevents segregation of the ingredients in certain types of concrete. All of these uses are based on its lattice forming ability inside a water solution. It creates a lattice and any other ingredient that may be in the solution is held in position by means of the lattice.

The second classification into which bentonite uses fall may be termed its sealing usage. Bentonite differs from most gelatins, in that it will not permit water to pass from cell to cell. Where a column of water is rested upon a bed of bentonite, those particles of bentonite adjacent to the water commence to adsorb water. The water may penetrate the bed a quarter of an inch before a tight seal is established; but once the seal is established no more water will seep into the remainder of the bentonite. This quality indicates that the bentonite forms seals, perhaps similar to a bee's honey comb, within which the water is held. This action is quite different from gelatine which under similar circumstances would keep passing water on to unwetted gelatin particles and form no barrier at all to the water in the column. This characteristic of bentonite has resulted in its being widely used to stop seepage in earth dams, irrigation ditches, reservoirs, etc. An alternative use has been its mixture in muds and the like for wall sealing, oil well holes, etc.

A third general usage to which bentonite is applied may be described as its coagulating properties. When bentonite is thoroughly dispersed in water by mechanical means so that it becomes the discontinuous phase of a solution, the addition of an excess of electrolyte will cause the bentonite to floc, whereupon its precipitates out of the water. This characteristic is obviously useful in purifying the water of alien substances and bentonite is extensively used in sanitary engineering. It is even used for the purpose of clarifying wines and vinegars and the like.

A final usage of bentonite is that of bonding. It seems to assist plasters and cements in forming a strong bond either between their own ingredients or when used as a mortar between two other elements. Bentonite seems to have some adhesive qualities on certain surfaces.

The use of the bentonite by me in my coating is wholly different from any usage of which I know. The bentonite is used for its separate and individual qualities, firstly, of transparency or semi-transparency; secondly, of forming a tight, thin film on the painted surface; and thirdly, because it remains water soluble so that it may be easily removed. In all of the coatings that follow it should be borne in mind that when the coating has dried on the wall—that is, when the water has evaporated out of it—in excess of 75 per cent of that coating is pure bentonite.

FORMULA I

The simplest formula for my coating is the following:

| Ingredient | Weight | Percentage by weight |
|---|---|---|
| | Pounds | Percent |
| 24½ lbs. Wyoming bentonite | 24½ | 3 |
| 98 gals. water | 764 | 96 |
| 7 lbs. vegetable gum compound containing gum arabic, gum karaya, and gum tragacanth | 7 | 1 |
| | 795½ | 100 |

The bentonite used is that derived from the Black Hills and has the swelling and adsorption powers generally possessed by that type of bentonite. The types of bentonite available on the market and any other substitutes therefor is discussed below under "Equivalents." The ingredients may be mixed in any order and the same coating will result.

The bentonite may be purchased in a grain size from 60 down to 200 or 300 mesh. Processors of bentonite have prepared special 30 to 80 mesh forms which disperse very readily. The water used should not be high in alkaline content. The consistency of a coating made according to the above formula is fairly viscous.

When the above coating is applied to the wall, its surface tension is such that the coating crawls, or draws up into pools. These pools upon drying present an almost wholly transparent coating consisting principally of the bentonite with the small percentage of vegetable gums. The coating is hard. In order to remove the coating, all one need do is wash it with water. The bentonite immediately goes into suspension in the water and is removed by the washing cloth from the wall.

FORMULA II

The simplest formula for my invention was found defective because the coating did not properly wet the surface of the interior wall. This was overcome by the addition of ¼ lb. of wetting agent to the above formula. For example:

| Ingredient | Weight | Percentage by weight |
|---|---|---|
| | Pounds | Percent |
| 24½ lbs. bentonite | 24½ | 3.00 |
| 98 gals. water | 764 | 96.00 |
| 7 lbs. vegetable gums | 7 | .97 |
| ¼ lb. wetting agent | ¼ | .03 |
| | 795¾ | 100.00 |

The type of wetting agent used is immaterial, excepting that it must be of a nature that will depress the surface tension of water because 90 per cent of the coating is water and it is the surface tension of the water that is controlling. The wetting agent may be added before or after the gum.

FORMULA III

The basic formula which is actually used contains a small amount of electrolyte and is as follows:

| Ingredient | Weight | Percentage by weight |
|---|---|---|
| | Pounds | Percent |
| 24½ lbs. bentonite | 24½ | 3.00 |
| 98 gals. water | 764 | 96.00 |
| 7 lbs. gum | 7 | .94 |
| ¼ lb. wetting agent | ¼ | .03 |
| ¼ lb. lime | ¼ | .03 |
| | 796 | 100.00 |

The order of mixing becomes important for the first time when Formula III is used. The lime is an electrolyte. If the lime is added prior to the swelling of the bentonite in the water, the bentonite's capacity to swell is impaired. This alters the viscosity of the finished coating and the ease of application depends entirely upon obtaining the desired viscosity. Also, if sufficient lime is added to the mixture, the bentonite will not swell at all. If such a coating, that is one composed of unswelled bentonite and adhesive, be permitted to dry upon a wall, subsequent application of water will not cause a swelling of the bentonite and hence there will be no facility of removal. The bentonite will not suspend itself in the water together with the gum but will remain tight to the wall. It is imperative, therefore, that the bentonite, gum and wetting agent be mixed with the water first and the lime added last.

The following three formulae are commercial formulae which have been found to produce a long life coating. These formulae are fundamentally the same as Formula III.

FORMULA IV

| | | |
|---|---|---|
| Suspendite (Glyco Products Co., Inc., New York city) | | 24¼ |
| Water | gals | 98 |
| Emulsone B of Glyco Products Co., Inc. | lbs | 7 |
| Ultrawet of Glyco Products Co., Inc. | lb | ¼ |
| Lime | lb | ¼ |

FORMULA V

| | | |
|---|---|---|
| KWK Volclay (American Colloid Co., Chicago) | lbs | 24½ |
| Water | gals | 98 |
| Gum mixture comprising 80% gum arabic and 20% gum tragacanth or karaya | lbs | 4 |
| Wetting agent | lb | ¼ |
| Lime | lb | ¼ |

FORMULA VI

| | | |
|---|---|---|
| XJ #35—200 mesh bentonite of American Colloid Company of Chicago | lbs | 24½ |
| Water | gals | 98 |
| Emulsone B of Glyco Products Co., Inc. of New York city, being a mixture of Caribbean gums | lbs | 7 |
| Wetting agent | lb | ¼ |

Formula VI is a preferred formula which is easily prepared. Attention is called to the fact that whenever the XJ #35 bentonite is used, the order of mixing ceases to be important. The reason for this is that the XJ #35 contains a delayed electrolyte, which, unlike lime and most of the thousands of electrolytes that are known, is very slowly soluble in water. A delayed electrolyte is any salt which will make the solution alkaline and which hydrolyzes slowly in water. The delayed electrolyte permits the bentonite to act in its normal way, that is by absorbing water, before it becomes dispersed in the water so as to have its electrolytic effect. More specifically, if the solid ingredients of Formula IV are thoroughly mixed and then dumped into water, the lime quickly dissolves and partly defeats the adsorptionability of the bentonite. On the other hand, where a delayed electrolyte is substituted for the lime in Formula IV, the solids may be thoroughly mixed and then added to water, in which circumstances the bentonite commences to disperse and the action of the delayed electrolyte in the water is so slow that the bentonite completes its dispersion before the electrolyte can act. The delayed electrolyte, as compounded with bentonite, forms no part of this invention. The American Colloid Company states that out of several thousand electrolytes whose solubility in water is quite rapid, there are only three or four electrolytes which act slowly and can be used to form their XJ #35.

Powder form

The use of a delayed electrolyte in the powdered bentonite, makes it possible to prepare my invention in powdered form and sell it to the consumer in that form, with exact instructions as to what quantity of water must be added.

Formula VII

| | |
|---|---|
| XJ #35—200 mesh of American Colloid Company _____ pounds__ | 24½ |
| Gum mixture_____ do____ | 7 |
| Wetting agent_____ pound__ | ¼ |

The above products are all available in powdered form and will remain in powdered form in a wide range of atmospheric temperatures. These ingredients are thoroughly mixed by agitation and are packaged in containers holding .324 pound. This amount of the above powdered mixture added to one gallon of water will produce my coating in liquid form.

The importance of this powdered form lies in the reduced cost of shipping. My invention in liquid form ready to be applied to the walls, is composed of more than 90% by weight of water. Shipping the product in powdered form will involve just one-tenth of the shipping charges of the liquid form, where charges are based on weight. The reason that the liquid form is retained at all is that the percentage of water in the mixture is important and the general run of the public is too inclined to experiment with the viscosity when only water need be added. The preferred ranges of the ingredients are set forth hereinafter. On the other hand, it is desirable to have the product in powdered form so that it can be sold to professional painters, who can and will mix the ingredients in proper proportions.

Ranges

*Bentonite.*—The amount of bentonite may be varied between two and eight per cent of the total weight, the other variable being the water, with the other ingredients remaining the same in amount and form. Thus, Formula I may read:

| | Percent |
|---|---|
| Bentonite _____ | 1 to 12 |
| Vegetable gum and wetting agent_____ | .5 to 1 |
| Water _____ | Balance |

If the bentonite exceeds eight per cent, the coating becomes too viscous to apply. If the bentonite is less than two per cent, the coating when dry is too thin to furnish the requisite protection. Between eight and twelve per cent, one gets a thick concentrate that may be thinned by water. It may be desirable to market this concentrate. A percentage of three or four per cent gives a viscosity which permits easy application of the coating and which results in a dried skin of satisfactory protective thickness. Also, there is a considerable leeway on each side of three or four per cent, which is a practical help. If the can is left open, water evaporates out, which increases the per cent bentonite content and thereby thickens the coating. Some evaporation can occur without the coating becoming impossible to apply. On the other hand, painters will alter the consistency of ready mixed paints, and while they are instructed not to add water, nevertheless there is a tolerance within which they can add water without altering the effectiveness of the coating. The addition of water is bad primarily because it raises the surface tension, causing crawling of the coating.

*Gum.*—The gum constitutes the adhesive and should be present in an amount sufficient to hold the bentonite to the coated surface, and no more. No range is stated on the gum because its function is clear. If the bentonite is increased to eight per cent, an increase in gum is warranted. If the bentonite is reduced to two per cent, a decrease in the gum should be made. Our tests which are set forth hereinafter show that the gum acts as an adhesive and that as the gum is increased, the film becomes harder, somewhat less soluble and a bit more opaque.

*Wetting agent.*—The quantity of wetting agent depends upon the surface tension required to wet a particular surface. The quantity is of no importance for this invention, because when added in any amount warranted to yield a practical surface tension, it has no effect upon the relationship of the bentonite, water and gum. There, of course, may be wetting agents which might affect this relationship, but the wetting agents ordinarily used to lower the surface tension in water solutions do not.

*Electrolyte.*—The quantity of electrolyte must be kept low. No range is here stated other than to say that the electrolyte must not exceed the amount necessary to precipitate the bentonite out of the solution. There is no minimum because a coating of Formulae III through V without an electrolyte is almost identical with a coating made with the electrolyte. Experiment seems to indicate that the coating containing the electrolyte is a bit smoother and a bit tougher than the coating which lacks the electrolyte.

Definitions and equivalents

When the term "bentonite" is used in this application, or in the claims, it means a colloidal clay which has the ability to adsorb water to at least two or three times its own weight and to swell at least four or five times its apparent volume. My experiments and my commercial product have been made with bentonites which were obtained, I believe, from the Black Hills area. I used the following:

KWK—Volclay, American Colloid Co., Chicago
XJ #35—200 mesh, American Colloid Co.
Volclay 33, American Colloid Co.
Suspendite, Glyco Products Co., Inc., New York city These bentonites have different expanding and adsorption powers. The Volclay will adsorb six to eight times its own weight of water, and has a swelling power of twenty-two times its specific volume and ten to twelve times its apparent volume. The Suspendite has considerably less power to adsorb or swell. It will adsorb four to five times its own weight of water and will swell five to six times its apparent size and twelve to fourteen times its specific volume. The practical difference between the Volclay coating and the Suspendite coating in consistency, ease of applying, hardness and adherence of the dried coating, and ease of removability is not perceptible, which leads to the conclusion that the additional adsorption and swelling powers of the Volclay provide no marked advantage over the Suspendite.

At the other extreme, there are clays classified as bentonites which have no perceptible adsorption and swelling powers, and these do not work—at least they are not readily removable. The theory of the removability of the bentonite is this: bentonite is a reversible lyophilic colloid—that is, bentonite will expand in adsorbing water and upon the removal of the water, the bentonite will contract to its original volume (in the absence of an electrolyte). In these coatings, as they dry on the wall, the bentonite contracts to its original volume (or partly toward its original volume, depending upon the amount of electrolyte added). Upon the rewetting during the washing off process, the bentonite again commences to swell and it is this swelling that makes it so readily removable from the wall. It is probable that a mere doubling of its apparent volume is all that is necessary to obtain the desired effect.

This invention is not confined to bentonite or to the substances that science may now or hereafter identify by that name. A transparent or semi-transparent reversible expansible colloidal clay soluble in water when applied in a thin film with a mild gum will suffice. The reason for this terminology is this: bentonite describes a substance found in the natural state. It is believed to consist principally (90%) of montmorillonite with traces of gypsum, sodic plagioclase, beidellite, calcium carbonate, biotite mica, etc. The substance montmorillonite alone does not swell perceptibly in water. It does become soapy to the touch. The montmorillonite does not explain the swelling or adsorption powers of bentonite, although it constitutes ninety per cent of the bentonite. The percentages of the other substances, moreover, vary even between fragments of bentonite obtained from the same lode. In short, no one knows what substance or arrangement of structure gives the bentonite its unusual properties. Under such circumstances an invention should not be limited by a term which may have a much more limited meaning when science has advanced further into understanding the substance. Defining the usable clay in terms of its adsorption of water and swelling powers, therefore, seems entirely warranted.

*Gum.*—The gum acts as a weak adhesive. It is believed to bind the bentonite particles to one another and to assist in binding the coat to the wall. Being soluble in water, the gum does not constitute a resistant to removal of the coating. All weak adhesives which are soluble in water will probably work.

The gums actually used have been gum arabic, gum karaya, Indian gum, and gum tragacanth. A blend of Caribbean gums bearing the trade name Emulsone B and marketed by the Glyco Products Company has produced very useful results. I have found that a mixture of eighty per cent gum arabic and twenty per cent gum tragacanth or gum karaya will yield a fine result. The difference in the result yielded by any of the gums is in the brittleness of the hardened coating and in the ease of removability. For example, when gum arabic alone is used, the coating is found to be more brittle than when the arabic-tragacanth mixture is used, and the finish is more likely to craze or crack and the coating seems a little more difficult to remove.

Probably the characteristics of the most desirable gum for my purpose are these: firstly least hard when dried at ordinary temperatures; and secondly, most soluble in water.

*Electrolyte.*—Any electrolyte which affects bentonite may be used. Briefly, the alkalies and the acids act most strongly, while the neutral electrolytes have less effect. The action of electrolytes on bentonite has been the subject of much learning and a brief discussion thereof, together with a list of usable electrolytes for bentonite, may be read in Data No. 207, Volclay Bentonite, by American Colloid Company, 363 West Superior Street, Chicago, Illinois.

As a matter of practice, I am using the XJ #35—mesh 200 of American Colloid Company of Chicago, regardless of whether the finished product is to be in liquid or powdered form. This eliminates problems as to the electrolytes.

Experiments

Four experiments will give a better idea of this coating. Firstly, a three per cent (by weight) bentonite in water solution (without gum) when applied to a transparent piece of glass will dry in about thirty minutes. The dried coating is quite milky, but upon the imposition of the glass over a colored surface, the coloring matter shines through. The bentonite dispersion upon drying remains fine. It may be removed from the glass with a razor blade with little difficulty, showing poor adherence to the glass, and during this scraping process it does not come off in a sheet, but is inclined to flake or powder into minute particles, showing poor adhesion between the bentonite particles. It may be removed from the glass by a simple water washing. Two strokes with a wet cloth removes it.

Secondly, the identical coating with the proper amount of gum appears much the same as above when dry, is as easily applied and as readily removed. There is approximately the same transparency. But the razor blade experiment is decidedly different. It is much more difficult to remove the coating having the gum, and as the coating is removed there is a distinct tendency not to flake but to come off in small sheets, showing greater adherence to the bentonite particles to each other.

The first and second experiments were on a very smooth surface. The third and fourth utilize, respectively, the first and second coatings but apply them to a piece of uneven flat toned (paint) cardboard. The cardboard carries a colored surface. These two experiments will be treated jointly. From the standpoint of application, transparency, speed of drying and ease of removal, the two coatings seem identical. But the coatings are very different when measured according to what happens when attempting to remove them when dry. The bentonite coating without the gum can be literally shaken loose from the cardboard by scratching the cardboard and causing it to vibrate. This coating can be caused to spray up from the cardboard surface by violent vibration. The coating containing the gum, on the other hand, cannot be removed by any vibration. The razor blade cannot get into crannies and crevices, and twitching or vibrating the cardboard has no effect upon the bentonite coating.

On any of the above four coatings or of Formulae I through VII, when dry, you may scrub furnace soot upon them, using good, strong pressure and scrubbing action, until they are as black as the soot. You may then dip a sponge in water, wipe it across the surface once, and then on the second stroke, you remove soot, bentonite coating and all, leaving the painted surface in its original condition.

I have an experiment which greatly assists in introducing this coating. A strip of cardboard two inches by six inches and having the porosity of a plaster wall is coated with size and one coat of white flat paint, which is permitted to dry. My coating is then applied to one-half of the painted cardboard. Upon drying, the whole is then sprayed with black soot from a spray gun. The soot on that part of the board protected by my coating may be removed by simple washing and the clean white paint is exposed. On the unprotected portion, some of the soot may be removed by washing, but much of it cannot be. Scrubbing first grinds the soot into the paint and then commences to remove the paint. This is a severe test.

Having thus described the invention, what I claim as new and desire to secure by Letters Patent of the United States, is:

1. In the art of coating and decoating interior wall surfaces, the step which comprises applying to the wall surface a freely flowing composition containing bentonite and gum in the ratio of 2 to 25 parts of bentonite to 1 part of gum, said composition characterized in its dried state by substantial transparency and ready water solubility.

2. In the art of coating and decoating interior wall surfaces, the step which comprises applying to the wall surface a composition containing by weight 87 to 98½% water, 1 to 12% bentonite and ½ to 1% of a vegetable gum and wetting agent and characterized in its dried state by substantial transparency and ready water solubility.

3. A wall coating composition comprising of from 1 to 12 parts of bentonite, ½ to 1 part of gum and the balance water, characterized in its dried state by substantial transparency and ready water solubility.

4. A wall coating composition containing the following ingredients in approximately the amounts shown:

| | | |
|---|---|---|
| Bentonite | pounds | 24½ |
| Water | gallons | 98 |
| Gum mixture comprising 80 per cent gum arabic and 20 per cent gum tragacanth or karaya | pounds | 4 |
| Wetting agent | pound | ¼ |
| Lime | pound | ¼ |

5. As a new article of manufacture, a wall, a protective coating of a non-water soluble type on said wall, and a second coating over said first coating, the latter coating comprising a water soluble skin containing bentonite and gum, the bentonite being present in an amount from 2 to 25 times the quantity of gum.

6. In the art of coating and decoating interior wall surfaces, the step which comprises applying to the wall surface a composition containing by weight 87 to 98½% water, 1 to 12% bentonite and ½ to 1% of gum tragacanth and wetting agent and characterized in its dried state by substantial transparency and ready water solubility.

7. A wall coating composition comprising of from 1 to 12 parts of bentonite, ½ to 1 part of gum tragacanth and the balance water, characterized in its dried state by substantial transparency and ready water solubility.

ELMER G. BERG.